2 Sheets—Sheet 1.

T. HULL & N. THOMAS.

MACHINE FOR HEADING BOLTS.

No. 6,747.

Reissued Nov. 16, 1875.

Witnesses:

J. W. Munday

H. F. Bruns.

Inventors:

Thomas Hull

Nicholas Thomas by

Lewis L. Coburn

Attorney

N. PETERS, PHOTO-LITHOGRAPHER, WASHINGTON, D. C.

T. HULL & N. THOMAS.

MACHINE FOR HEADING BOLTS.

No. 6,747. Reissued Nov. 16, 1875.

Witnesses:
J W Mundy
H. F Brunt

Inventors:
Thomas Hull
Nicholas Thomas
by Lewis L. Coburn
Attorney

N. PETERS, PHOTO-LITHOGRAPHER, WASHINGTON, D. C.

UNITED STATES PATENT OFFICE.

THOMAS HULL AND NICHOLAS THOMAS, OF CHICAGO, ILLINOIS.

IMPROVEMENT IN MACHINES FOR HEADING BOLTS.

Specification forming part of Letters Patent No. 112,248, dated February 28, 1871; reissue No. 6,747, dated November 16, 1875; application filed October 3, 1871.

*To all whom it may concern:*

Be it known that we, THOMAS HULL and NICHOLAS THOMAS, of Chicago, in the county of Cook and State of Illinois, have invented certain new and useful Improvements in Bolt-Heading Machines; and we do hereby declare the following to be a full, clear, and exact description thereof, which will enable others skilled in the art to which our invention appertains to make and use the same, reference being had to the accompanying drawings, forming part of this specification, in which—

Figure 1:
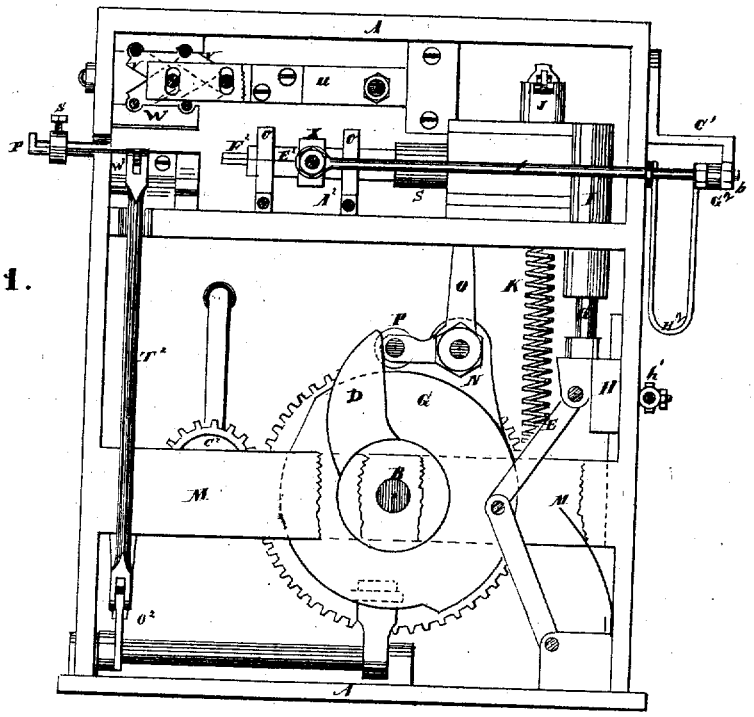
Figure 5:
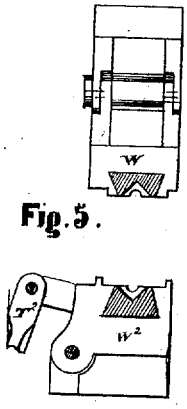
Figure 2:
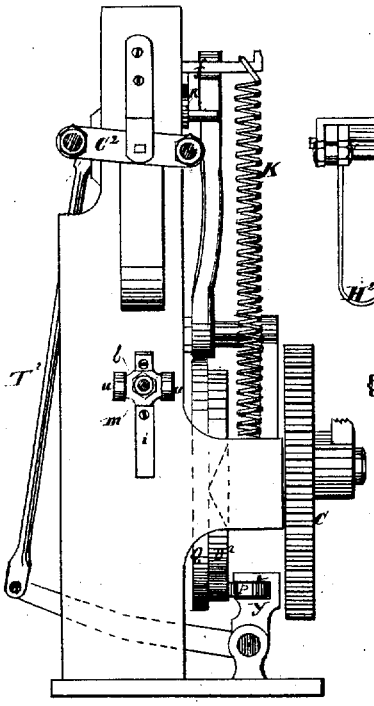
Figure 3:
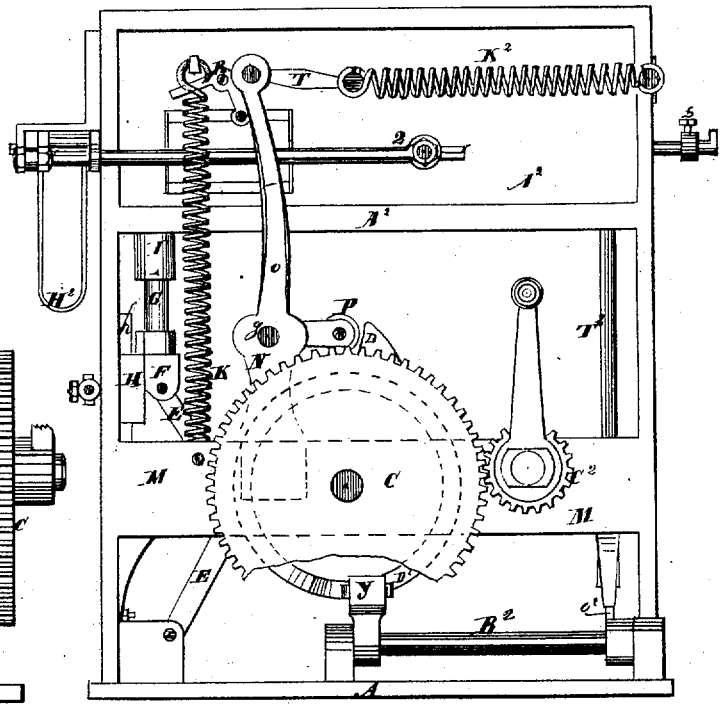
Figure 4:
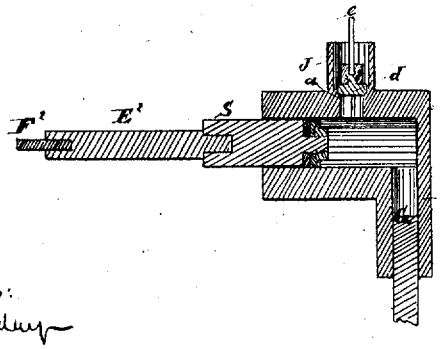

Figure 1, Plate 1, is a side elevation, showing those parts of the machine which are at the left hand in Fig. 2. Fig. 2, Plate 2, is an end view of the same. Fig. 3, Plate 2, is a side elevation, showing those parts of the machine which are at the right hand in Fig. 2. Fig. 4, Plate 2, is a vertical longitudinal central section of the press employed in operating the heading-tool; and Fig. 5, Plate 1, is a vertical transverse section of the dies employed in shaping the bolt-head.

Similar letters of reference indicate corresponding parts in the several figures of the drawing.

The object of our invention is to make a machine which forms a bolt-head by pressure. The end of the rod is placed in dies and pressed, when hot, into the form desired for the bolt-head.

The nature of our invention consists in the employment, in the machine, of a hydraulic press, operated by the gearing of the machine, and used to furnish the pressure required to form the bolt-head; and it further consists in the dies which form the bolt-head, and in the various mechanism for operating the same, a description of which is hereafter more fully given.

By forming the bolt-head in dies, by pressure, the bolts are made of a uniform length, and the heads all of the same size and shape; and by using a hydraulic press, the motions of the machine are made positive, the power is readily regulated, and if a bolt falls between the dies, or anything happens so that the machine cannot make a full stroke, it is not liable to break, for when the given power is applied, the water escapes from the press. In the operation of the machine, the various motions of the different parts of the machine must be in regular succession—for instance, the dies must close on the bolt-rod before the thrust of the press to form the head, and the dies must be held firmly together during the thrust, then immediately open and discharge the bolt, remain open a sufficiently long time to receive another bolt-iron, and then close again before another thrust of the press. It is therefore important that the press and the other operative parts of the machine should receive their power and motion from the same source. We accomplish this by driving our hydraulic press and the other parts of the machine from the same driving-shaft.

The opening and closing of the dies are accomplished by making the upper one movable in guides, and they are held firmly closed by operating the movable die by knee-jointed levers. The bolt is discharged from the dies by tilting the lower die-block on its hinges, so as to let the hot bolt drop out. The movement of the upper die, by means of levers that will hold it firmly in place when down, is important, and the tilting of the lower die is also important.

In the accompanying drawings, A is the frame of the machine, and B the main or driving shaft. The shaft B is extended across from side to side of the frame, and provided on its outer end with a gear-wheel, C, which engages with a gear-pinion, $C^2$, to which power is applied for operating the moving parts of the machine. Fixed upon the shaft B is a cam, D, which comes in contact with a buckle-jointed lever, E, the lower end of which is hinged to the lower portion of the frame, and at the upper end to the lower end of the guide F, secured to the plunger G of the pump.

The guide F H is dovetailed to and moves upon a vertical guide or way, *h*, secured to the main frame. Attached and firmly secured to the central portion or partition $A^2$ of frame A is a hydraulic press, I, into which the plunger G of the pump passes. The press I is provided, upon its side, with a reservoir, J, which communicates with the press by means of an aperture, *a*, cut through the upper surface of the cylinder of the same. The aperture *a* is provided with an escape-valve, *d*, the shank of which is socket-jointed to the valve-stem *e*. The valve-stem *e* extends upward, and is pivot-jointed to the lever *f*, which is hinged to the upper side of said reservoir, and extends horizontally across the same, through partition $A^2$, and is provided at its outer end with or attached to a spiral spring, K, which extends downward to the cross-piece M of the frame, and is secured thereto. Attached to said cross-piece is a vertical upright, N, which is provided at its upper end with a horizontal pivot, *g*, upon which is fitted an L-shaped lever, O. To the end of the lower and horizontal portion of said lever is fitted an anti-friction wheel, P, which traverses the periphery of a cam-wheel, Q, on shaft B, whereby the upper end of said lever receives an oscillating movement. Attached to said partition, at or near the upper end of lever O, is an L-shaped lever, R, which communicates with the lever O and the lever *f* of the reservoir. Thus, as the lever O is moved backward by the action of the cam-wheel Q, the valve *d* is raised upward, and the cylinder of the press is filled with water, preparatory to an outward movement of the piston S of the press. Attached to the upper end of said lever O is a pitman, T, to which is connected a horizontal slide, U. The slide U moves in guides or ways recessed within said partition, and it is attached, at its outer end, to the center of the buckle-jointed levers V V′, the upper ends of which are hinged or jointed to the top portion of the frame, and at their lower ends to the upper or moving die-block W. Thus, as the upper end of the lever O is tilted backward by the cam on the wheel Q, said die-block is raised vertically by the traversing of the wheel P upon the surface of the cam-wheel Q, and as the wheel P passes over the inclined surface of the cam, the lever O is tilted forward by the recoil of the spring $K^2$, which is attached to the end of said pitman, and to the side of the frame, whereby the levers V V′ are thrown to a vertical position, thus forcing the die-block W downward against the upper side of the lower die-block $W^2$. The block $W^2$ is hinged to the frame in a manner admitting of an automatic reciprocal movement with block W. Attached to the outer side of the block $W^2$ is a pitman, $T^2$, which extends downward, and is hinged to the outer end of lever $O^2$ on the rock-shaft $B^2$. Said shaft is supported by suitable bearings secured to the lower portion of the frame. Attached to the inner end of said shaft is a vertical lever, Y, which is provided at its upper end with an anti-friction wheel, $P^2$, which traverses the side of the rim of cam-wheel $D^2$ on the shaft B. The arrangement of said cam is such as to tilt the outer end of lever $O^2$ downward when the die-plate W is at its highest vertical position, adjusted by the action of the cam-wheel Q. Thus die-block $W^2$ is tilted automatically forward from a horizontal to a vertical position.

Fixed to the outer side of guide F H of the pump-plunger is a pivot, *h′*, which extends through slots *i*, cut vertically in the upright of the frame. Upon said pivot, at or near its outer end, is a cross-head, *l*, secured thereon by means of the nut *m*, which bears upon a spring interposed between it and the cross-head. Fixed upon the end of said cross-head are auxiliary wheels *u u*, so arranged as to traverse upon said upright, the object of which is to impede, through the action of the spring, the downward movement of the pump-plunger as the cam D recedes from the lever E. Attached to die-block $W^2$ is a gage, P, so arranged as to admit of being adjusted to any desired point, and firmly secured in position by means of collar and set-screw *s*, the object of which is to govern the length of the bolt. Piston S of the press comes in contact with and against slide $E^2$, which receives the heading-tool. Said slide moves in guides *o o*, secured to partition $A^2$ of the frame. Secured to said slide is a collar, *x*, to the outer ends of which are attached pitmen 1 and 2, on opposite sides of the frame. Said pitmen extend horizontally outward, through guides fixed to the upright of the frame, and are provided at their outer ends with a cross-head, $G^2$, to which is pivoted spring $H^2$, said spring forcing the piston of the press backward as the pump-plunger recedes, bringing said cross-head in contact with or against set-screw *b*, secured in the lower end of bracket $C^1$, whereby the thickness of the bolt-head is governed, as the stroke of the press-piston is in all cases the same from its starting-point, said starting-point being regulated by the length of set-screw, whereby the distance between the end of the heading-tool and shoulder of the header is increased or diminished, as required; or the same may be adjusted by means of a collar on the outer end of the piston, which comes against the end of the cylinder of the press, said collar and piston being screw-threaded, to admit of an easy adjustment.

The reservoir of the press may be supplied with water by means of suitable pipes leading from a second reservoir, or from a hydrant. (Not shown in the drawing.)

In arranging the machine for the heading of different-sized bolts, the central or shaping portions of the dies are changed, being fitted into a dovetailed recess in the main die-blocks, which admit of the same.

The operation of our machine is as follows: The iron of which the bolt is made, being properly heated, is placed in die $W^2$, and the power is then applied to pinion $C^2$, which communicates with lever O through the medium of cam-wheel Q and gear-wheel C on shaft B, allowing wheel P of said lever to pass the cam. Said lever is then tilted forward by means of spring $K^2$, forcing die-block W downward by the action of slide U and levers V V′, thus upholding the bolt between the compressible sides of the dies. Cam D of shaft B is then thrown in contact with or against jointed lever E, forcing plunger G into the pump whereby the pressure of the water is thrown against the piston S of the press, forcing heading-tool $F^2$ into the die. Thus the bolt is upset, and pressed to proper shape, forming the head. As the required amount of pressure is received upon the bolt, escape-valve *d* is raised and the water escapes into reservoir J. Heading-tool $F^2$ and piston S is then withdrawn by means of spring $H^2$. As cam D recedes from lever E die-block W is adjusted. Lever O is then tilted downward by the action of cam-wheel $D^2$ against wheel $P^2$ of said lever, which communicates with die-block $W^2$ by means of pitman $T^2$, tilting the same to a vertical position, and the bolt is discharged from the machine.

Having described the nature and object of our invention, what we claim as new, and desire to secure by Letters Patent, is—

1. The combination, in a bolt-heading machine, of the hydraulic-press I, safety-valve J, the heading-tool $F^2$, and the bolt-heading dies W $W^2$, so conjoined and arranged as to be actuated as one machine, substantially as specified and shown.

2. The combination of the cams D, Q, and $D^2$ with the heading-tool and the dies, in the manner and by the means substantially as described.

3. The hinged die-block $W^2$, pitman $P^2$, lever $O^2$, and rock-shaft $B^2$, or their equivalents, arranged so as to tilt the die, substantially as specified.

4. The combination of the spring $H^2$, cross-head $G^2$, bracket C, pitmen 1 2, the collar-arms X, and header $F^2$, when arranged substantially in the manner and for the purpose specified.

5. The combination of the die-holders W $W^2$, levers V V′, pitman $T^2$, lever $O^2$, and rock-shaft $B^2$, all constructed and arranged as described.

THOMAS HULL.
NICHOLAS THOMAS.

Witnesses:
FRANCIS F. WARNER,
HEINR. F. BRUNS.